United States Patent
Desai et al.

(10) Patent No.: US 9,940,293 B1
(45) Date of Patent: Apr. 10, 2018

(54) METHOD FOR EFFICIENT STORAGE AND BACKUP OF DATA VIA SCSI TRANSPORT

(71) Applicant: EMC Corporation, Hopkinton, MA (US)

(72) Inventors: Keyur Desai, Cary, NC (US); Shobhan Chinnam, Cupertino, CA (US); Jerrold Heyman, Chapel Hill, NC (US)

(73) Assignee: EMC CORPORATION, Hopkinton, MA (US)

( * ) Notice: Subject to any disclaimer, the term of this patent is extended or adjusted under 35 U.S.C. 154(b) by 19 days.

(21) Appl. No.: 14/978,877

(22) Filed: Dec. 22, 2015

(51) Int. Cl.
*G06F 3/06* (2006.01)
*G06F 13/42* (2006.01)

(52) U.S. Cl.
CPC .......... *G06F 13/426* (2013.01); *G06F 3/0608* (2013.01); *G06F 3/0619* (2013.01); *G06F 3/0659* (2013.01); *G06F 3/0665* (2013.01); *G06F 3/0689* (2013.01)

(58) Field of Classification Search
CPC .................................. G06F 13/42; G06F 3/06
See application file for complete search history.

(56) References Cited

U.S. PATENT DOCUMENTS

| | | | |
|---|---|---|---|
| 7,865,663 B1 * | 1/2011 | Nelson | G06F 13/42 711/112 |
| 2004/0151188 A1 * | 8/2004 | Maveli | H04L 12/4641 370/398 |

* cited by examiner

*Primary Examiner* — David X Yi
*Assistant Examiner* — Zubair Ahmed
(74) *Attorney, Agent, or Firm* — Womble Bond Dickinson (US) LLP

(57) ABSTRACT

Systems and methods are disclosed that advertise and expose a SCSI disk device type to a client computer or virtual machine, the disk device type acting as a transport for SCSI commands to/from a storage appliance over a Fiber Channel network. Each SCSI command is transported in one or more Fiber Channel frames. A virtual machine can write data to the storage appliance using through a disk opened with the disk device type. Data written through the disk can be deduplicated and/or compressed before storage on the storage appliance. The SCSI disk device type can support SCSI pass-through mode, virtual RDM, or physical RDM.

20 Claims, 10 Drawing Sheets

| Features Available with Pass-through and Raw Device Mappings (RDM) | | | |
|---|---|---|---|
| Virtualization software features | Pass-through Mode | Virtual Mode RDM | Physical Mode RDM |
| SCSI Commands Passed Through | YES | NO | YES, except Report LUNs command |
| vCenter Server Support | YES | YES | YES |
| Snapshots | NO | YES | NO |
| Distributed Locking | NO | YES | YES |
| Moving a VM to a new host | NO | YES | YES |
| Cluster Support | NO | YES | YES |
| Flash Read Cache | NO | YES | NO |

FIG. 4

METHOD FOR EFFICIENT STORAGE AND BACKUP OF DATA VIA SCSI TRANSPORT

TECHNICAL FIELD

This disclosure relates to the field of a client and a storage device communicating over a Small Computer System Interface (SCSI) transport using various implementing protocols such as iSCSI, Fibre Channel, or Infiniband.

BACKGROUND

Some modern high-capacity storage devices, such as a storage appliance, offer hundreds of terabytes, and up to petabytes, of storage capacity comprising numerous storage units coupled together via a SCSI interface within the storage device. Numerous clients may simultaneously access the storage device using SCSI commands. Clients can be host computing devices or virtual machines on a host computing device ("clients"). Some high-capacity storage devices offer features such as data deduplication and compression to efficiently store and backup data from clients. To effectively use the high capacity and features of such a storage device, a high bandwidth communication channel, such as a Fibre Channel network, can be used between the numerous clients and the storage device.

A client that wants to communicate with the storage device using SCSI commands packaged within one or more Fibre Channel frames needs to become aware of how to communicate with the storage device over a Fibre Channel. The storage device can advertise a different SCSI device types, including the SCSI processor type to a client that implements a SCSI-over-Fibre Channel protocol between a host computing device and the storage device. However, virtualization management software typically does not virtualize the SCSI processor type. Thus a virtual machine running on a host computing device does not virtualize the SCSI processor type.

BRIEF DESCRIPTION OF THE DRAWINGS

Embodiments of the invention are illustrated by way of example, and not by way of limitation, in the figures of the accompanying drawings in which like reference numerals refer to similar elements. In the following description of the figures, the inventive concepts herein have been described with respect to a SCSI transport implemented using a Fibre Channel protocol. However, the disclosure is not to be construed as limited to a SCSI transport over Fibre Channel protocol. A SCSI transport can be implemented over a wide variety of protocols including iSCSI, Fibre Channel, or Infiniband.

FIG. 4 illustrates, in a table, a comparison of virtualization software features that can be supported by a virtual machine manager using a SCSI disk device types having a specified device mode characteristic, according to some embodiments.

DETAILED DESCRIPTION

Figure 1:
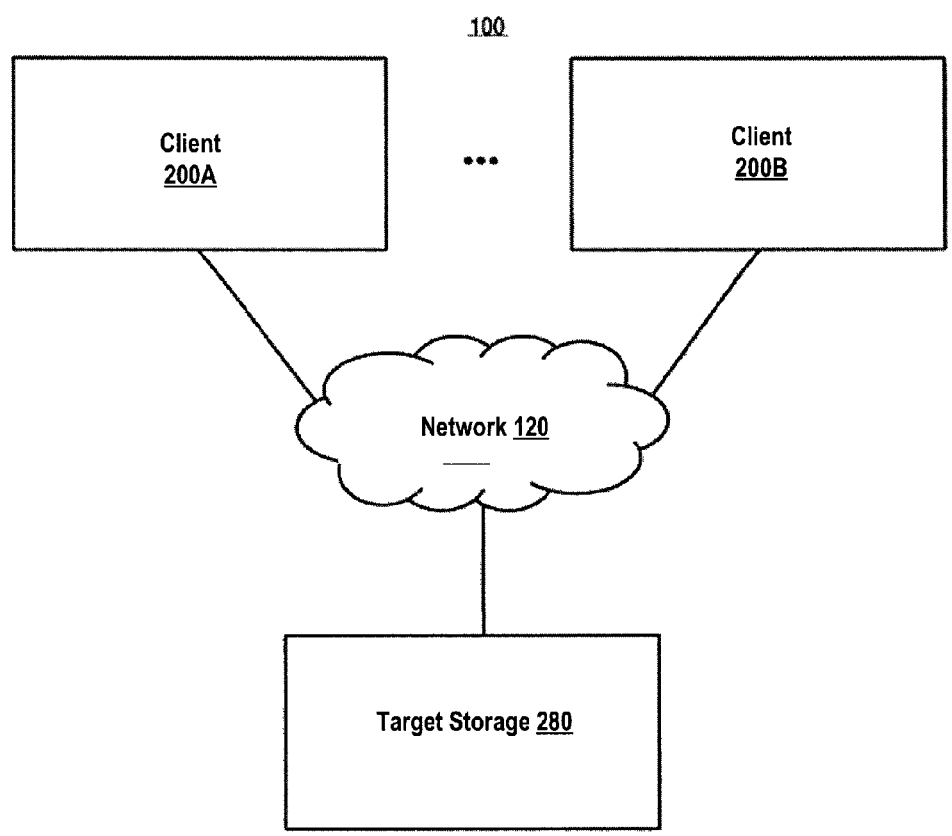
FIG. 1 illustrates, in block diagram form, an overview of a virtual infrastructure in which a plurality of clients read and write data to one or more target storages using SCSI commands packaged in one or more Fibre Channel (FC) frames, using a SCSI disk device type advertised by a target storage, in accordance with some embodiments.

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Embodiments are described for enabling a host computing device or a virtual machine to open a handle to a disk device having a SCSI disk device type that will support SCSI commands transported to a storage device ("storage appliance") across a Fibre Channel network. In an embodiment, the SCSI commands are transported using one of iSCSI, Fibre Channel, or Infiniband protocols. The storage device can advertise a SCSI disk device type that is supported by the host operating system of the host computing device, or by the guest operating system of a virtual machine ("client") on the host computing device. In an embodiment, the storage device advertises the SCSI disk device type as a generic SCSI disk device type. A host operating system of a host computing device and a guest operating system of a virtual machine may both be referred to as a client operating system. In an embodiment, the client operating system can store a library file that adds functionality to a generic SCSI disk device type so that SCSI commands can be packaged in one or more Fibre Channel frames and transported to and from the storage device. In an embodiment, a virtual connection is established between the client and the storage device. In an embodiment, a virtual machine management software can include an application programming interface (API) that adds functionality to the advertised SCSI disk device type to support transporting SCSI commands in one or more Fibre Channel frames between the client and storage device. In an embodiment, a Fibre Channel adapter on a host computing device can comprise one or more hardware processors that transport a SCSI command packaged in one or more Fibre Channel frames to or from a storage device.

The SCSI disk device type advertised by the storage device can be made visible via a SCSI pass-through mode, a virtual raw disk mode, or a physical raw disk mode from the virtual machine manager to the virtual machine to access storage on the storage device. In an embodiment, a virtual machine can open a file in a virtual machine file system that maps the file to one or more storage logical unit numbers (LUNs) on the storage device. The SCSI disk device type advertised by the storage device can implement data deduplication and/or data compression prior to storing data written by the virtual machine to the storage device. In an embodiment, the advertised SCSI disk device type can have a device characteristic of 2 terabytes (2 TB) of storage capacity. In an embodiment, the advertised SCSI disk device type can have a disk device characteristic of non-zero bytes of storage capacity. The SCSI disk device type can act as a communication channel between a client and the storage device, over a virtual connection between the client and the storage device, the communication channel supporting transport of a SCSI command packaged in one or more Fibre Channel frames.

In an embodiment, a virtual connection identifier identifies the virtual connection between the client and storage device. A virtual connection can be identified by a virtual connection ID, a generation number, and a verifier. In an embodiment, a virtual connection ID can be a 14-bit value, encoded into the LBA field of SCSI READ and WRITE requests transported over the Fibre Channel protocol.

Any of the above methods can be embodied on a non-transitory computer-readable medium programmed with executable instructions that, when executed, perform the method. A system can be programmed with executable instructions that, when executed by a processing system, can perform any of the above methods.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, other types of invocations or parameters via the API.

FIG. 1 is a block diagram illustrating an infrastructure 100 of a data storage system 100 according in which a plurality of clients read and write data to one or more target storages 280 using SCSI commands packaged in one or more Fibre Channel (FC) Frames, using a SCSI disk device type advertised by the target storage 280. The data storage system 100 includes, but is not limited to, one or more client systems 200A-200B communicatively coupled by a network 120 with one or more target storage devices 280. Clients can be a host computer having a Fibre Channel adapter, or one or more virtual machines running on a host computer having a Fibre Channel adapter ("clients"). In an embodiment, the host computer can have an Ethernet or other network adaptor to implement transport of SCSI commands over, e.g. iSCSI or Infiniband protocol. Target storage device(s) 280 can be primary storage for client systems 200A-200B, and/or for virtualized clients hosted by client systems 200A-200B. Target storage devices 280 can be exposed to virtualized clients as one or more SCSI disk drives in a virtual file system.

To efficiently transfer data within a data storage system 100, storage device 280 can advertise a SCSI disk device type that a client can use to send a SCSI command to, or receive a SCSI response from, the storage device 280. In an embodiment, the SCSI command can be packaged in one or more Fibre Channel frames. In an embodiment, the SCSI command can be transported using an iSCSI, Fibre Channel, or Infiniband protocol. SCSI requests traditionally specify a logical block address (LBA) of a data block on a storage unit to be written to or to be read from. When using the SCSI disk device type of the present disclosure, the LBA field, or other field of a SCSI COMMAND block, can contain a 3-tuple that identifies, and can be used to verify, a particular virtual connection between the client and storage device 280. The 3-tuple can include a virtual connection ID, a generation number, and a verifier.

In an embodiment, a virtual connection identifier (virtual connection ID) can have 14 bits allowing for up to about 16,000 simultaneous virtual connections from all clients to the same storage device 280. The storage device may choose to use the virtual connection ID as an index into a table of virtual connection IDs, for quick lookup. In an embodiment, the generation number can be a 32 bit value, maintained independently for each virtual connection ID, incremented each time the virtual connection ID is reused (e.g., used by one client, then closed, then opened by another client). The generation number can be used to detect stale virtual connection IDs. In an embodiment, the verifier can be a 256 bit value whose contents are opaque to the client. The storage device can generate the verifier value using some combination of: a serial number of the storage device, a process ID of a process on the storage device associated with the virtual connection, a timestamp of when the process having the process ID started, or monotonically incrementing a connection creation ordinal value within the process lifetime. The timestamp and process ID components can be included to ensure that different instances of the process on the same storage device never assign the same verifier values. The combination of the three values (3-tuple): virtual connection ID, generation number, and verifier, should be unique through all space and time, and allows the client and storage device to reliably identify the virtual connection associated with a storage device operation.

In an embodiment, the full 3-tuple can be transmitted as part of every SCSI command transported over the virtual connection using the advertised disk device type. This allows the client and storage device to recognize requests for stale or invalid virtual connections, and prevents the potential data corruption which could result from incorrectly processing such requests.

In an embodiment, a storage device can detect that a client is using the advertised disk device type for SCSI traffic that is intended for a conventional SCSI disk device type that does not support transporting a SCSI command in one or more Fibre Channel frames, or over iSCSI or Infiniband protocol. When a client sends a SCSI commands destined for a conventional SCSI disk device type, over a handle opened using the advertised SCSI disk device type, then such SCSI command will not have the virtual connection identification information (3-tuple) stored in the LBA field of the SCSI COMMAND block. Such commands can return an error by the storage device because the SCSI commands do not contain the correct format in the LBA field of the SCSI COMMAND block to support transporting of the SCSI commands over the virtual connection using the Fibre Channel. In an embodiment, if a storage device receives a SCSI command that does not contain virtual connection identification information in the LBA field of the SCSI COMMAND block, the storage device can return a SCSI status of GOOD. Although issuing false SCSI GOOD status in response to a SCSI WRITE by a client that does not support SCSI-over-Fibre Channel communication may lead to an application thinking that it has actually written data to a storage device, a SCSI WRITE is usually accompanied by a SCSI VERIFY, which will fail indicating to the application that the SCSI WRITE was not successful, thereby preserving the characteristics of the disk device with respect to the guest operating system 240 handling the disk device requests.

A client system 200 can generate a SCSI command, write the SCSI command to a SCSI disk drive having the SCSI disk device type advertised to the client system 200 by target storage 280. Client system 200 can then package the SCSI command in one or more FC frames, and transport the FC frame(s) to the target storage 280. Target storage 280 can then unpackage the SCSI command, determine whether the SCSI command contains the virtual connection identification information, and optionally passes a validation test, then the target storage can process the SCSI command. Target storage can generate a SCSI response message to a SCSI command, package the SCSI response message in one or more FC frames and transmit the one or more FC frames to the client 200 in response to the received SCSI command.

In an embodiment, a target storage processing a SCSI WRITE command can include deduplicating data to be written before storing the data. Processing the SCSI WRITE command additionally, or alternatively, can include compressing the data to be written before storing the data. In an embodiment, processing the SCSI WRITE command can comprise storing the data to be written without compression or deduplication. Processing a SCSI READ command can include restoring deduplicated data to its original, undeduplicated state and returning the undeduplicated data to the requesting client 200. Processing a SCSI READ command can further include decompressing data and returning the decompressed data to the requesting client. Processing a SCSI READ command can further include reading the requested data from storage and returning the data to the requesting client without further processing.

A client 200 can be any type of client such as a personal computer (e.g., desktops, laptops, and tablets), a workstation, a handheld device, a Web-enabled appliance, a gaming device, a media player, or a mobile phone (e.g., Smartphone), or any computing system operable to communicate over a network 120. An exemplary client 200 is described below with reference to FIG. 9.

SCSI requests can be sent from clients 200A-200B and received at the target storage 280 via the FC network 120. Network 120 can be any type of network using Fibre Channel protocol. In one embodiment, the network 120 is a storage area network (SAN). The network 120 can feature any suitable network topology. Thus, the network 120 can be a point-to-point network. Alternatively, the network 120 can be an arbitrated loop network. In another embodiment, the network 120 can be a switched fabric network. In such embodiments, the network 120 can include one or more Fibre Channel switches or other network hardware (not shown) and visibility of the target storage 280 and/or clients 200A-200B can be controlled with Fibre Channel zoning.

As shown in FIG. 1, client 200 is coupled with one or more target storage devices 280. A storage unit 280 can be implemented locally (e.g., single-node operating environment) or remotely (e.g., multi-node operating environment) via an interconnect (not shown), which can be a bus or a network. In one embodiment, one of the storage devices 280 operates as an active storage unit to receive and store external or fresh data, while the other storage unit operates to periodically archive data from the active storage unit according to an archiving policy or scheme. A storage unit 280 can be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. The storage devices 280 can also be combinations of such storage devices. In some embodiments, the storage devices 280 can be organized into one or more volumes of Redundant Array of Inexpensive Disks (RAID).

Storage unit 280 can comprise a storage appliance having many internal disk drives coupled via a SCSI interface, and further including an operating system, a deduplication engine, one or more hardware processors, memory, a SCSI over Fibre Channel protocol stack, a Fibre Channel adapter, and a disk advertising module. A storage unit 280 is described in further detail with respect to FIG. 3, below.

Figure 2:
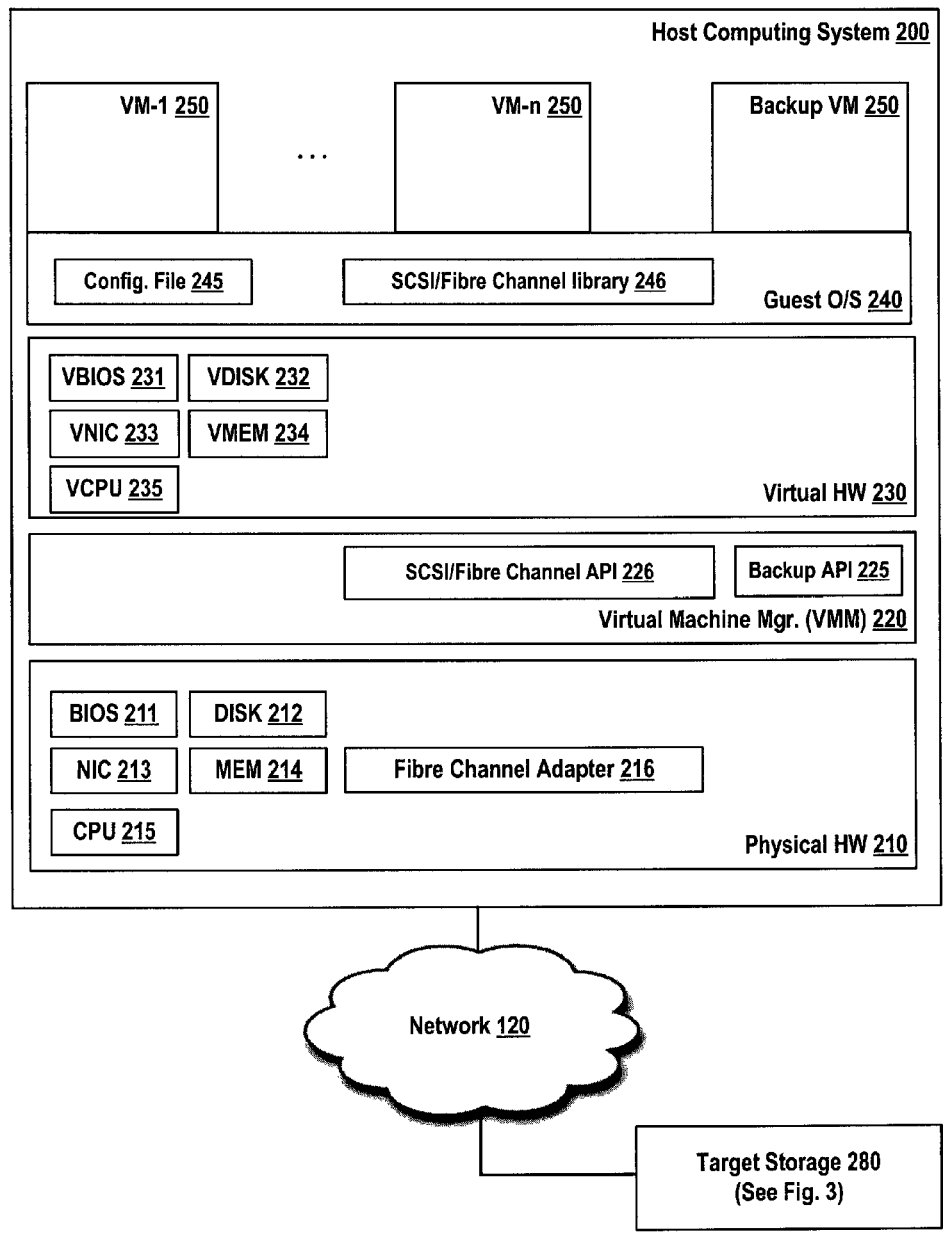
FIG. 2 illustrates, in block diagram form, a host computing device configured to read and write data to one or more target storages using SCSI commands packaged in one or more FC frames, using a SCSI disk device type advertised by a target storage, in accordance with some embodiments.

FIG. 2 illustrates, in block diagram form, a host computing device 200 configured to read and write data to one or more target storages 280 using SCSI commands packaged in one or more Fibre Channel frames, using a SCSI disk device type advertised by the target storage.

A data storage system 100 can include one or more host computing systems 200 ("client device") and one or more target storage(s) 280 ("primary storage") coupled via a network 120. Target storage 280 is described below, with reference to FIG. 3.

Network 120 can be any type of network such as a local area network (LAN), a wide area network (WAN) such as Internet, a corporate intranet, a metropolitan area network (MAN), a storage area network (SAN), a bus, or a combination thereof, wired and/or wireless. The network 120 supports SCSI transport and various protocols that implement SCSI transports including iSCSI, Infiniband, Fibre Channel protocol, and the like.

Client device 200 can include physical hardware 210, a virtual machine manager (VMM) 220, virtual hardware 230, a guest operating system 240, and one or more virtual machines (VMs) 250. A VM 250 can comprise a backup VM 250 that is configured to perform backups of one or more disk files of one or more VMs 250.

Physical hardware 210 can include a physical basic input-output system (BIOS) 211, one or more physical disks or storage devices 212, one or more network interface cards (NIC) 213, memory 214, and one or more processors or CPUs 215, and a Fibre Channel (FC) adapter 216 that is coupled to the network 120. FC adapter 216 can include at least one hardware processor, memory, software components, such as an FC protocol stack, and hardware that interfaces to the network 120. Client device 200 can be implemented in accordance with the computing system described with reference to FIG. 9, below.

Client device 200 can include virtualization machine manager (VMM, "virtualization software") 220 that provides a virtualization abstraction layer to support one or more VMs 250 on client device 200. VMM 220 can include a backup application programming interface (API) 225 that can access information within VMs 250 and within client device 200 that may be needed to perform a backup or restore of a VM 250, of data generated by a VM 250, or of one or more virtual disks 232. Backup API 225 can be used to perform an image backup or restore of an entire VM 250. Backup API 225 can communicate with a VM 250, guest operating system (OS) 240, virtual hardware 230, or physical hardware 210 via inter-process communication, such as messaging, shared memory, sockets, or other communication methods. VMM 220 can further include a SCSI/Fibre Channel application programming interface ("API") 226. SCSI/Fibre Channel 226 can be called by a Fibre Channel Adapter 216 to unpackage a SCSI command received by the host computer 200, wherein the received SCSI command is packaged within one or more FC frames. SCSI/Fibre Channel API 226 can also be called by VMM 220 in response to a VM 250 requesting a SCSI service from a SCSI disk device type that supports SCSI/Fibre Channel protocol. VM 220 can call SCSI/Fibre Channel API 226 to package a SCSI command, such as a SCSI READ, WRITE, or INQUIRY command, into one or more FC frames, and can cause the FC adapter 216 to initiate transmission of the SCSI command to target storage 280. SCSI/Fibre Channel API 226 can also be called by FC adapter 216 to facilitate advertising a SCSI disk device type that is to be advertised to VMs 250. The SCSI disk device type can process SCSI commands transported over Fibre Channel. In an embodiment, the SCSI commands can alternatively be transported using iSCSI or Infiniband protocol.

Client device 200 can further include virtual hardware 230 that can correspond to physical hardware 210, such as a virtual BIOS 231, one or more virtual storage devices (VDISK) 232, one or more virtual network interface cards (VNIC) 233, virtual memory 234, and one or more virtual processors 235. Virtual disk 232 can be opened using the advertised disk device type that supports SCSI commands over Fibre Channel protocol between a virtual machine 250 and a target storage 280.

In an embodiment, a virtual BIOS 231 identifier within the virtual hardware 230 can provide a portion of a globally unique identifier (UUID) for VM 250 for purposes of performing functionality described herein. In an embodiment, a VM 250 UUID can be persistent with a particular virtual machine 250, even if the VM 250 is moved ("migrated") to a different client device 200.

Client device 200 can also include one or more guest operating systems (OS) 240. Guest OS 240 can include, Unix, Linux, Windows, or other operating system. Configuration file 245 can reside within guest OS 240. Configuration file 245 can store information that can be used by VMM 220 to implement each virtual machine 250, such as a list of the virtual disks 232 that are accessible by a particular VM 250. Configuration file 245 can further include filenames and file properties of one or more files in a virtual file system for a VM 250. Configuration file 245 can further include a name of a raw disk mapping file that maps a virtual disk 232 to a raw disk on source storage 280. Guest OS 240 may further include one or more library files. In an embodiment, guest OS 240 can include a SCSI/Fibre Channel library 246 that can expose an advertised SCSI disk device type to a VM 250.

Figure 3:
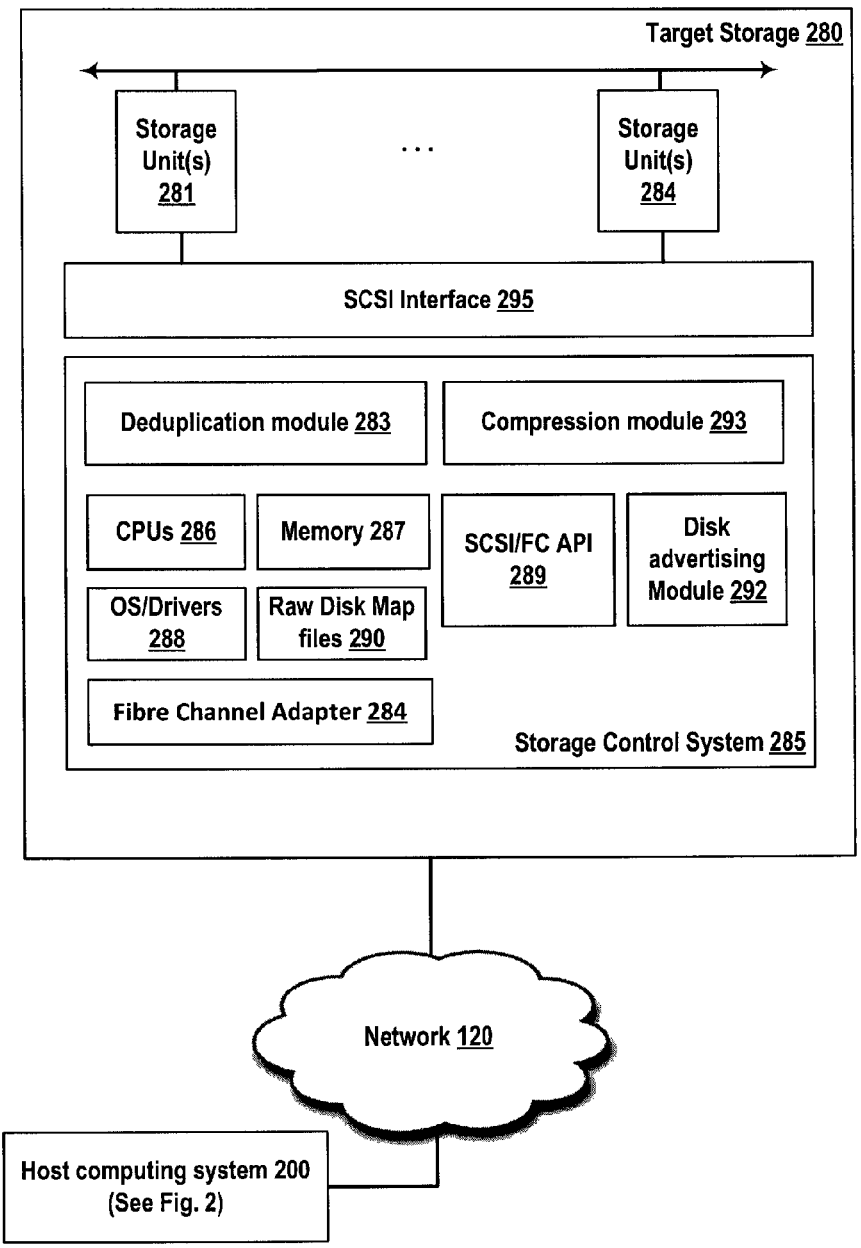
FIG. 3 illustrates, in block diagram form, a target storage configured to store and retrieve from one or more virtual machines on one or more host computing devices using SCSI commands packaged in one or more FC frames in accordance, through a SCSI disk device type advertised by the target storage, with some embodiments.

FIG. 3 illustrates, in block diagram form, a target storage 280 configured to store and retrieve data from one or more virtual machines on one or more clients 200 or virtual machines 250 using SCSI commands packaged in one or more Fibre Channel (FC) frames. Client 200 or VM 250 can receive an advertisement from target storage 280 of a disk device type that can be used to access target storage 280 via SCSI commands using a SCSI transport protocol.

Target storage 280 can include a storage control system 285, a SCSI interface 295, and one or more storage units 281-284. Target storage 280 can be coupled to host computing system 200 via network 120.

Storage control system 285 can include a Fibre Channel (FC) adapter 284, one or more CPUs 286, memory 287, and an operating system 288. The operating system 288 may include device drivers for one or more components of the storage device 280. Storage control system 285 can further include a SCSI Transport (e.g. SCSI/FC) application programming interface (API) 289, a disk advertising module 292, a deduplication module 283, and a compression module 293.

CPUs 286 can include any type of processing system comprising at least one hardware processor. A CPU can include a general-purpose CPU, a pipe-lined processor, a parallel processor, a programmable memory circuit, a digital signal processor, or other processor type. Memory can include dynamic or static RAM, read-only memory, flash memory, hard disk, or other memory. Operating system 288 can be an embedded operating system Unix, Linux, a custom-written or proprietary operating system, or other operating system. Drivers can include drivers as may be needed to support hardware such as memory 287, CPUs 286, storage units 281-284, SCSI interface 291, FC adapter 284, and other components of target storage 280.

Fibre Channel adapter 284 can utilize one or more CPUs 286 of storage control system 285. In an embodiment, FC adapter 284 can comprise at least one hardware processor dedicated to the FC adapter 284. FC adapter 284 can further include dedicated hardware memory and software components. FC adapter 284 can advertise a SCSI disk device type to client computers 200 and virtual machines 250 ("client device") that can be used to transport a SCSI command packaged within one or more FC frames, to/from clients 200 and storage device 280. The advertised SCSI disk device type is supported by most guest OS s 240 and host operating systems that host computer 200 may run. The advertised SCSI disk device type can be exposed as, e.g., a generic SCSI disk device type. The advertised SCSI disk device type can be used like a SCSI disk device, accessed using SCSI commands. However, the disk device type is actually a transport for SCSI commands over Fibre Channel protocol between the client 200 and the target storage 280. Fibre Channel adapter 284 can receive the SCSI command from VM 250 over the network 120. In an embodiment, a virtual connection is established between VM 250 and FC adapter 284. Fibre Channel adapter 284 can unpackage the SCSI command from the one or more FC frames by calling SCSI/FC API 289. For a SCSI WRITE command, the SCSI/FC API 289 can optionally pass the data to be written either to deduplication module 283 for deduplication before writing, or to SCSI interface 295 to write the data to storage units 281-284. In an embodiment, SCSI/FC API 289 can optionally, or in addition to deduplication, pass the data to be written to compression module 293 before writing the data to storage units 281 284. In an embodiment, the SCSI commands can be transported using iSCSI or Infiniband protocol, in lieu of Fibre Channel.

Storage units 281-284 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Target storage units 281-284 may also be combinations of such devices. In the case of disk storage media, the target storage units 281-284 may be organized into one or more volumes of Redundant Array of Inexpensive Disks (RAID).

Target storage 280 can further include raw disk mapping files 290 that map a virtual disk 232 of a virtual machine 250 to one or more portions of storage on the target storage 280. A portion of target storage 280 can be a logical unit number (LUN). Raw disk mapping to one or more portions of storage can be physical mapping or a virtual mapping. A VM 250, e.g., can open a file using the disk device type, the file to be used for writing data from the VM 250 to the target storage 280. In an embodiment, the advertised SCSI disk device type can use raw disk mapping (RDM) from a file in a virtual file system on VM 250 to a logical unit number (LUN) on target storage 280. Writing to the disk device type causes the SCSI command to be packaged within one or more FC frames that are transported to the target storage 280.

Target storage 280 can include a deduplication module 283 and a compression module 293. In response to a SCSI WRITE request write a data file to be stored in storage units 281-284, optional deduplication storage engine 283 can be configured to segment the data file into multiple segments according to a variety of segmentation policies or rules. Deduplication storage engine 283 only stores a segment in a storage unit 281-284 if the segment has not been previously stored in the storage unit. In the event that a segment has been previously stored, metadata stores information enabling the reconstruction of a file using the previously stored segment. As a result, segments of data files are stored in a deduplicated manner. Data stored in the storage units 281-284 may alternatively, or in addition, be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, different storage units may use different compression methods (e.g., main or active storage unit from other storage units, one storage unit from another storage unit, etc.).

Target storage 280 may be a storage appliance or a storage server used for any of various different purposes, such as to provide multiple users with access to shared data and/or to back up mission critical data. Target storage 280 may be, for example, a file server (e.g., an appliance used to provide NAS capability), a block-based storage server (e.g., used to provide SAN capability), a unified storage device (e.g., one which combines NAS and SAN capabilities), a near-line storage device, a direct attached storage (DAS) device, a tape backup device, or essentially any other type of data storage device. Target storage 280 may have a distributed architecture, or all of its components may be integrated into a single unit. Target storage 280 may be implemented as part of an archive and/or backup storage system such as a deduplication storage system.

FIG. 4 illustrates, in a table, a comparison of virtualization software features 450 features that can be supported by a virtual machine manager 220 (virtualization software) using different SCSI disk device types (modes) 455, 460, and 465. In the table 400, a "Yes" indicates that a virtualization software feature 450 is supported by the disk device mode. Similarly, a "No" indicates that the virtualization software feature 450 is not supported by the disk device mode.

A SCSI disk device advertised by the target storage 280 can be accessed in at least three manners from a guest OS 240 running on VMM 220 (virtualization software). First, a SCSI disk device opened using the advertised SCSI disk device type can be accessed via generic SCSI pass-through mode 455. Second, the SCSI disk device can be added to a virtual machine 250 in virtual raw device mode (RDM) 460. Third, the SCSI disk device can be added to a virtual machine 250 in physical raw device mode 465. Not all features of VMM 220 are supported by all manners of accessing the disk device. Table 400 illustrates a comparison of virtualization software 220

SCSI pass-through mode allows the guest OSs 240 direct access to the SCSI disk device advertised by the target storage 280. All SCSI commands issued by the guest OSs 240 are routed directly to a storage unit 281-284 via SCSI interface 295.

Raw device mapping (RDM) provides a mechanism for a VM 250 to have direct access to a LUN on a storage 28-284 for Fibre Channel and Internet Small Computer Systems Interface (iSCSI) protocols. An RDM is a mapping file in, e.g., a separate VMware® File System (VMFS) volume that acts as a proxy for a raw physical storage device, such as storage unit 281-284. The RDM allows a VM 250 to directly access and use the storage device 281-284. The RDM contains metadata for managing and redirecting disk access to the physical storage unit 281-284. The mapping file gives some of the advantages of direct access to a physical device while keeping some advantages of a virtual disk 232 in VMFS. RDM merges VMFS manageability with raw device access. RDMs can be described in terms such as mapping a raw device into a data store, mapping a system LUN, or mapping a disk file to a physical disk volume. All of these terms refer to RDMs. An RDM can be thought of a as a symbolic link from a VMFS volume to a raw LUN. The mapping makes LUNs appear as files in a VMFS volume. The RDM, not the raw LUN, is referenced in the virtual machine configuration file 245. The RDM contains a reference to the raw LUN.

Virtualization software features 450 can include SCSI command pass-through 405, VMware vCenter® Server 410, disk snapshots 415, distributed locking 420, relocating a virtual machine to another host 425, cluster support 430, and flash read cache 435.

In virtual raw disk mode 460, the virtualization software 220 sends only READ and WRITE to the mapped device 281-284. The mapped device appears to the guest OS 240 exactly the same as a virtual disk file in a VMFS volume. The real hardware characteristics are hidden. In virtual raw disk mode 460, the virtualization software 220 supports features such as advanced file locking for data protection and snapshots 415 for streamlining development processes. Virtual raw disk mode is also more portable across storage hardware than physical mode, presenting the same behavior as a virtual disk file.

In physical mode raw disk mode 465, the virtualization software 220 passes all SCSI commands to the target storage device, except the REPORT LUNs command is virtualized so that the VMM 220 can isolate the LUN to the owning virtual machine 250. Otherwise, all physical characteristics of the underlying hardware are exposed. Physical mode is useful to run SAN management agents or other SCSI target-based software in the virtual machine 250. Physical mode also allows virtual-to-physical clustering for cost-effective high availability.

As shown in table 400, not all disk device modes support all features 450. Thus, a target storage 280 can be configured to advertise a SCSI disk device type that meets a particular storage purpose or application for the target storage 280 by advertising a SCSI disk device type that utilizes the maximizes the features needed for the configuration, and minimizes features not needed for the configuration. In an embodiment, a target storage 280 can be configured to advertise a disk device type of virtual raw disk mode 460 to use for transporting SCSI commands over a network 120 between a virtual machine 250 and a target storage 280. Advertising a SCSI disk device type that supports snapshots 415, distributed locking 420, and cluster support 430 would be beneficial in configuring a target storage 280 to be a direct storage or a backup storage device. In an embodiment, target storage 280 can advertise multiple disk device types for one target storage 280.

Figure 5:
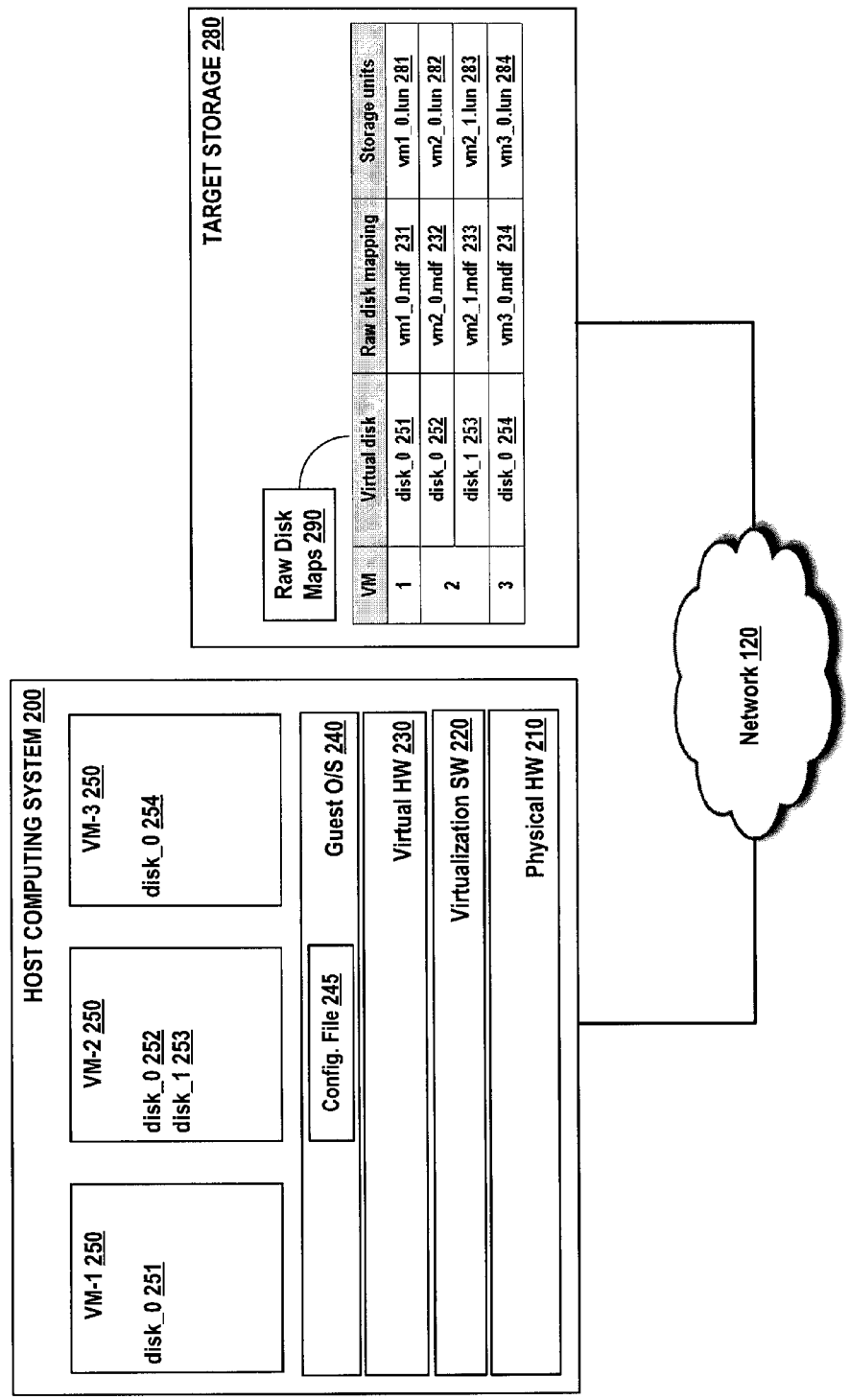
FIG. 5 illustrates a mapping of virtual disks to storage in a virtual infrastructure, according to some embodiments.

FIG. 5 illustrates a mapping 290 of virtual disks to storage in a virtual infrastructure, according to some embodiments. In an example, a first virtual machine VM-1 (250) can have a virtual disk disk_0 (251). A second virtual machine VM-2 (250) on host 200 can have two virtual disks disk_0 (252) and disk_1 (253). A third virtual machine VM-3 (250) can have a virtual disk disk_0 (254). Configuration file 245 can indicate a mapping between virtual disks 251-254 and raw disk map metadata files 231-234 stored on source storage 280. Raw disk maps 231-234 can storage a mapping to storage units, or portions of storage, such as logical unit numbers (LUNs). A storage unit file, e.g. vm1_0.lun (281) can contain a mapping to one or more physical storages corresponding to the LUN. Physical storages can comprise a storage such as storage appliance(s) 280 having one or more storage units 281-284. Mapping of virtual disks to LUNs can be a raw disk mapping or SCSI pass-through. Raw disk mapping can be virtual or physical raw disk mapping.

Figure 6A:
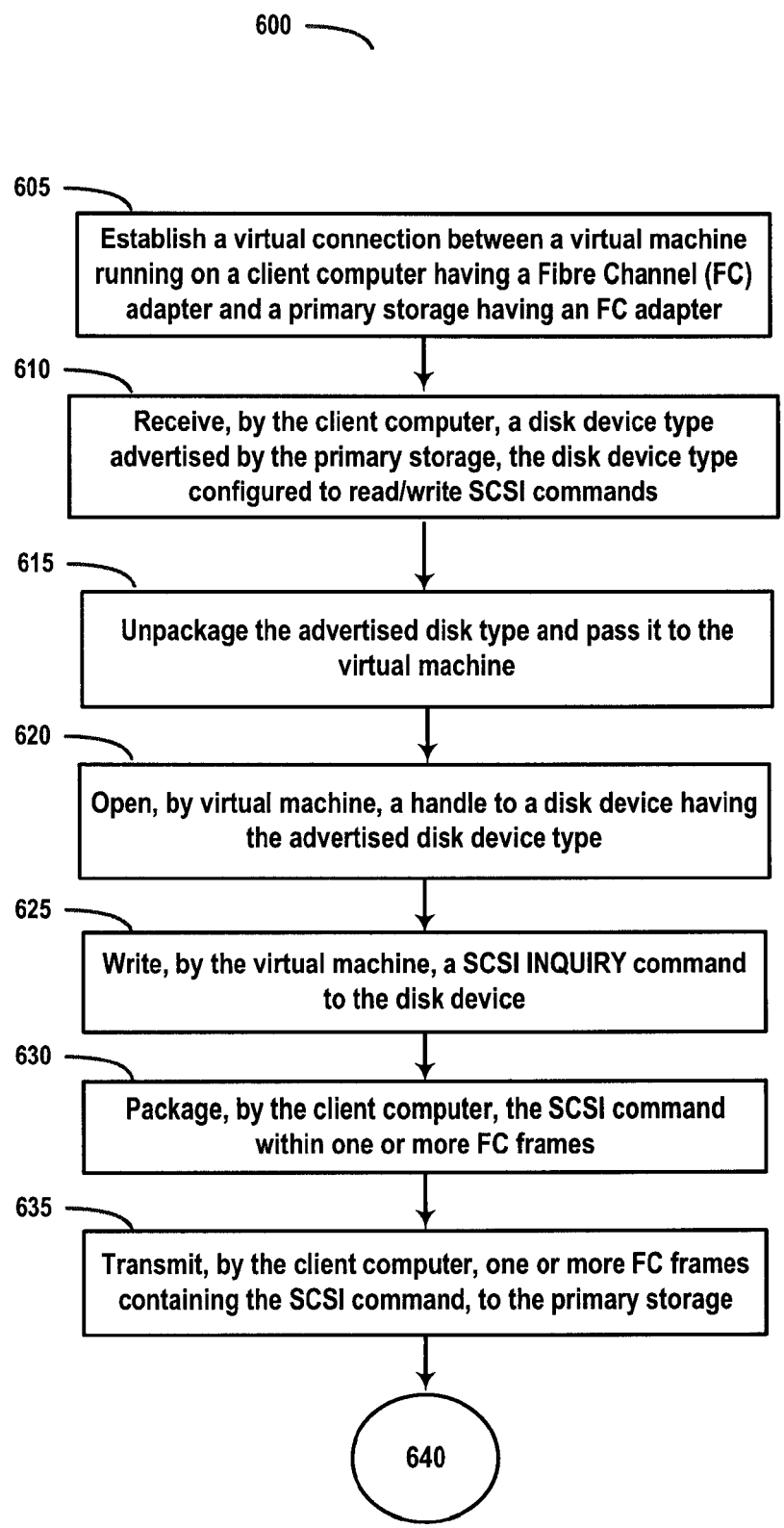
FIGS. 6A and 6B illustrate a flow chart of a method of a client device receiving an advertisement of a SCSI disk device type, and sending one or more SCSI commands to a SCSI disk having the advertised disk device type wherein each command is packaged in one or more Fibre Channel frames according to some embodiments.
Figure 6B:
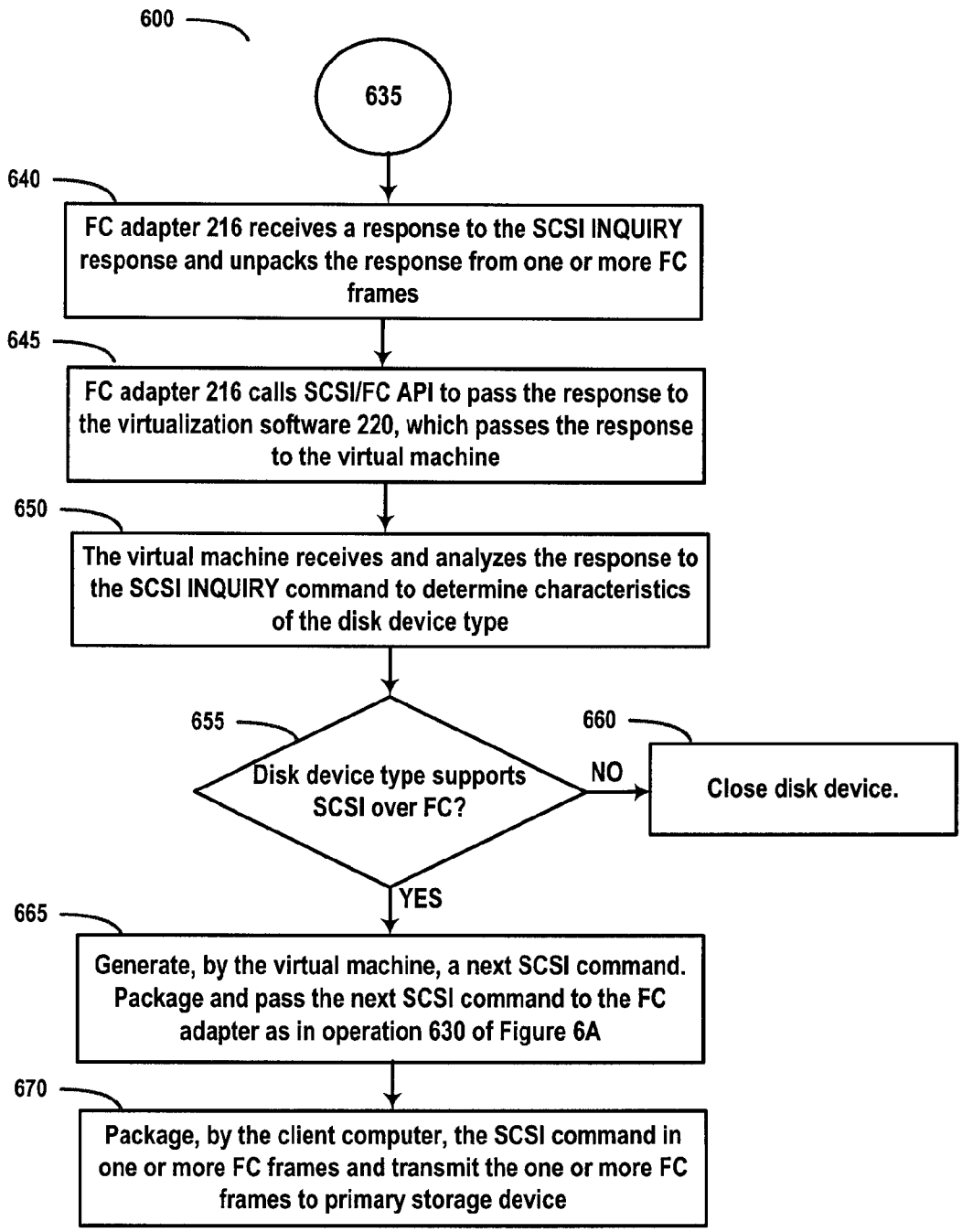

FIGS. 6A and 6B illustrate a flow chart of a method 600 of a client device receiving an advertisement of a SCSI disk device type, and sending one or more SCSI commands to a SCSI disk having the advertised SCSI disk device type, wherein each SCSI command is packaged in one or more Fibre Channel frames. The method 600 is described in terms of a VM 250 opening a SCSI disk and sending one or more SCSI commands through the SCSI disk as a transport for the SCSI commands. In an embodiment, a process running on a client machine 200 can also implement the same functionality in lieu of a VM 250.

In FIG. 6A, at operation 605 a virtual machine 250 or a client 200 ("client") can establish a virtual connection between the client and the target storage 280 over the network 120.

In operation 610, FC adapter 216 on client 200 can receive an advertisement of a SCSI disk device type from target storage 280. The advertisement is packaged within one or more FC frames and is transported to the client 200 over the network 120. In an embodiment, FC adapter 216 can receive more than one SCSI disk device type from target storage 280. The disk device type(s) are configured to transport SCSI commands over a network 120 in one or more FC frames. The disk device type(s) are further configured to operate in one of: SCSI pass-through mode 455, virtual RDM mode 460, or physical RDM mode 465.

In operation 615, client computer 200 FC adapter 216 can call SCSI/FC API 226 to unpackage the disk device type advertisement from one or more FC frames. SCSI/FC library 246 can be used to expose the disk device type(s) to guest operating system 240, and thereby advertise the disk device type(s) to VM 250.

In operation 620, VM 250 can open a handle to a SCSI disk device using one of the advertised SCSI disk device types. In an embodiment, the SCSI disk device type uses virtual raw disk mode (RDM).

In operation 625, VM 250 can generate a SCSI INQUIRY command to the SCSI disk having the advertised SCSI disk device type. VM 250 can all SCSI/FC library 246 to pass the SCSI INQUIRY to VMM 220.

In operation 630, VMM 220, in turn, can call SCSI/FC API 226 to pass the SCSI INQUIRY to client computer FC adapter 216 hardware to package the SCSI INQUIRY command into one or more FC frames. In an embodiment, SCSI/FC API 226 can package the SCSI INQUIRY command into one or more FC frames and pass the one or more FC frames to the client computer FC adapter 216.

In operation 635, FC adapter 216 can transmit the one or more FC frames to the target storage 280 over the virtual connection established in operation 605. Method 600 continues at operation 640, described with reference to FIG. 6B.

In FIG. 6B, at operation 640, FC adapter 216 can receive a SCSI response message to the SCSI INQUIRY command of operation 635, from target storage 280. FC adapter 216 can unpackage the SCSI response from one or more FC frames.

In operation 645, FC Adapter 216 calls SCSI/FC API in VMM 220 to pass the response to VMM 220. In an embodiment, FC adapter 216 can call SCSI/FC API 226 to unpackage the SCSI response from the one or more FC frames. In an embodiment, FC adapter 216 can make a single call to SCSI/FC API 226 to both pass the one or more FC frames to VMM 220 and to unpackage the SCSI response from the one or more FC frames.

In operation 650, VM 250 can receive the SCSI response from VMM 250. VM 250 can analyze the SCSI INQUIRY response from the target storage 280 to determine characteristics of the disk device type. Characteristics can include whether the SCSI disk device supports transporting a SCSI command in one or more FC frames, the operating mode of the SCSI disk device (SCSI pass-through, virtual RDM, physical RDM), capacity of the SCSI disk device, etc., features supported by the SCSI disk device, e.g. the features listed in Table 400 with reference to FIG. 4.

In operation 655, VM 250 can determine, from the disk device characteristics returned in the response to the SCSI INQUIRY, whether the SCSI disk device supports using the SCSI disk device as a transport to send SCSI commands to, and receive SCSI responses from, a target storage 280 by packaging the SCSI commands in one or more FC frames. It can also be determined whether the disk device type supports a feature that the VM 250 may need, as described in the table 400 of FIG. 4.

If, in operation 655, it is determined that the SCSI disk device type does not support using the SCSI disk device to transport SCSI commands packaged in one or more FC frames, over a virtual connection, then in operation 660, the VM 250 can close the disk device and the method 600 ends.

In operation 665, VM 250 can generate a next SCSI command to be packaged in one or more FC frames and transmitted to target storage 280 over the virtual connect using Fibre Channel protocol. VM 250 can pass the command to VMM 220. In an embodiment, VM 250 can make one or more calls to SCSI/FC library 246 to pass the next SCSI command to VMM 220. VMM 220, in turn, can call SCSI/FC API 226 to pass the next SCSI command to client computer FC adapter 216 hardware to package the next SCSI command into one or more FC frames. In an embodiment, SCSI/FC API can package the next SCSI command into one or more FC frames and pass the one or more FC frames to the client computer FC adapter 216.

In operation 670, the next SCSI command can be packaged in one or more FC frames and transmitted to the target storage 280 over the network 120 and virtual connection between the VM 250 and target storage 280, as described in operations 630 and 635, above.

Figure 7:
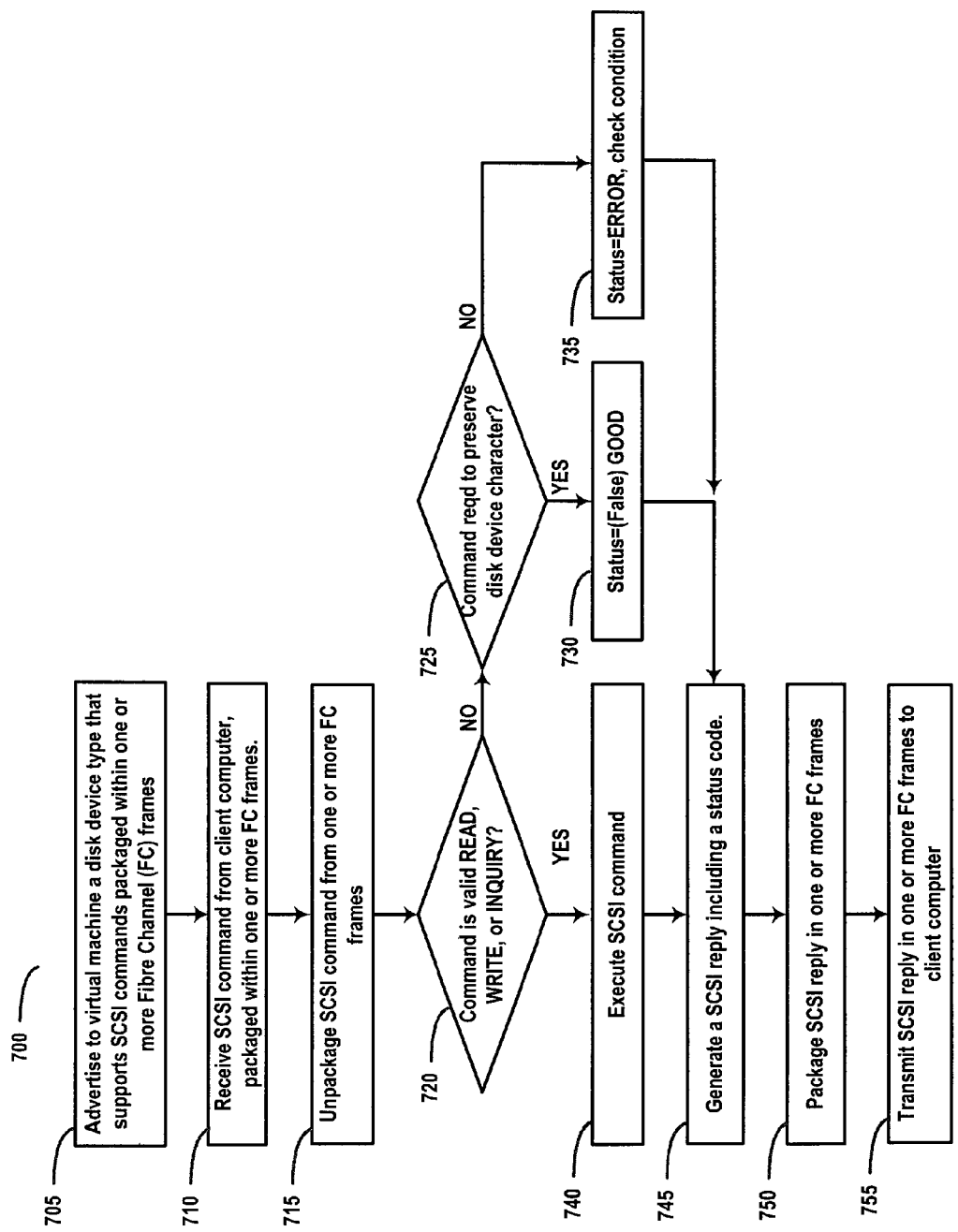
FIG. 7 illustrate a flow chart of a method of a storage device advertising a SCSI disk device type to a client device and receiving one or more Fibre Channel frames that package a SCSI command, using the advertised SCSI disk device type according to some embodiments.

FIG. 7 illustrates a flow chart of a method 700 of a target storage device 280 advertising a SCSI disk device type to a client device 200 or VM 250. The method 700 further includes receiving one or more Fibre Channel frames from the client computer 200 or VM 250 that package a SCSI command using the SCSI disk device type. The method 700 is described with reference to a virtual machine 250, communicatively coupled to a target storage 280 by a virtual connection over a network 120. The method 700 can also be practiced between a standalone client computer 200 communicatively coupled to target storage 280 over a network 120. In an embodiment, client computer 200 is communicatively coupled to target storage 280 using a virtual connection over the network 120.

In operation 705, target storage 280 advertises one or more SCSI disk device types to VM 250. The SCSI disk device type(s) support transmitting a SCSI command packaged in one or more FC frames, over a virtual connection on a network 120.

In operation 710, target storage 280 FC adapter 284 can receive a SCSI command packaged in one or more FC frames over the virtual connection on the network 120.

In operation 715, the SCSI command can be retrieved from the one or more FC frames. Retrieval of the SCSI command from the FC frames can be performed by the FC adapter 284. In an embodiment, the SCSI command can be removed from the FC frames by a call to the SCSI/FC API 289 within storage control system 285. In an embodiment, one or more of CPUs 286, memory 287, and OS/Drives 288 can be used to unpackage the SCSI command from the FC frames.

In operation 720, it can be determined whether the SCSI command is, or is not, SCSI READ, WRITE, or INQUIRY.

If, in operation 720, it is determined that the SCSI command is not SCSI READ, WRITE, or INQUIRY, then in operation 725 it can be determined whether the SCSI command is required to preserve the disk device character with respect to the virtual machine guest operating system 240.

If, in operation 725, it is determined that the SCSI command is required to preserve the disk device character with respect to the guest operation 240 of the virtual machine 250, then in operation 730 a false status of GOOD (or, SUCCESSFUL) can be set in a status code, and the method resumes at operation 745.

If in operation 725 it is determined that the SCSI command is not required to preserve the disk device character with respect to the guest operating system 240 of the virtual machine 250, then in operation 735 a status of ERROR can be set in a status code, and the method resumes at operations 745.

If, in operation 720, it is determined that the SCSI command is a valid READ, WRITE, or INQUIRY command, then the method can resume at operation 740.

In operation 740, the SCSI command is executed on the target storage 280. The execution of the SCSI command will depend upon the particular SCSI disk device type that was opened by VM 250 and used to send the SCSI command in operation 710: SCSI pass through mode, virtual raw disk mode, or physical raw disk mode. Supported features of each disk device type are shown in table 400 as described above with reference to FIG. 4.

In operation 745, a SCSI reply can be generated by storage control system 285. In an embodiment, the SCSI reply is a generated by the storage unit(s) 281-284 and passed to storage control system 285 for generating the SCSI reply message.

It should be noted that operations 720 through 745 can alternatively, or in addition, be practiced by a client as described in FIGS. 6A and 6B, above. A client can determine whether a particular SCSI command is supported by a particular disk device type (SCSI pass-through, virtual RDM, or physical RDM) and choose whether to send the particular SCSI command to the target storage for processing. If the SCSI command is not supported, it need not be sent to the target storage. A status GOOD can be returned to the virtual machine generated the SCSI command and a SCSI reply can be generated and returned to the virtual machine. In an embodiment, the client determination can be made by the client Fibre Channel Adapter 216.

In operation 750, the SCSI reply is packaged within one or more FC frames. In an embodiment, the SCSI LBA field of the SCSI COMMAND block contains a 3-tuple that identifies the virtual connection being used to transport the packaged SCSI command to the client 200 over the network 120.

In operation 755, the SCSI reply is transmitted to the client computer that is hosting VM 250 as one or more FC frames over the network 120.

Figure 8:
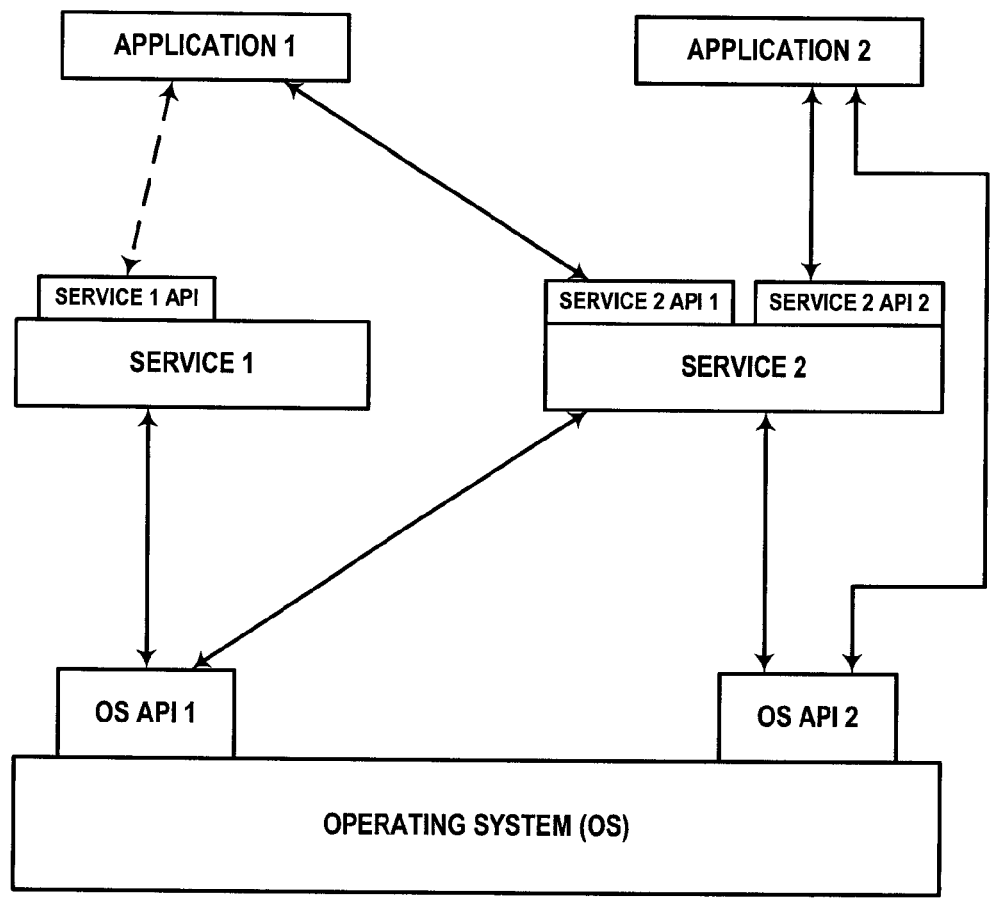
FIG. 8 illustrates an exemplary embodiment of a software stack usable in some embodiments of the invention.

In FIG. 8 ("Software Stack"), an exemplary embodiment, applications can make calls to Services 1 or 2 using several Service Application Programming Interfaces ("APIs") and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 9:
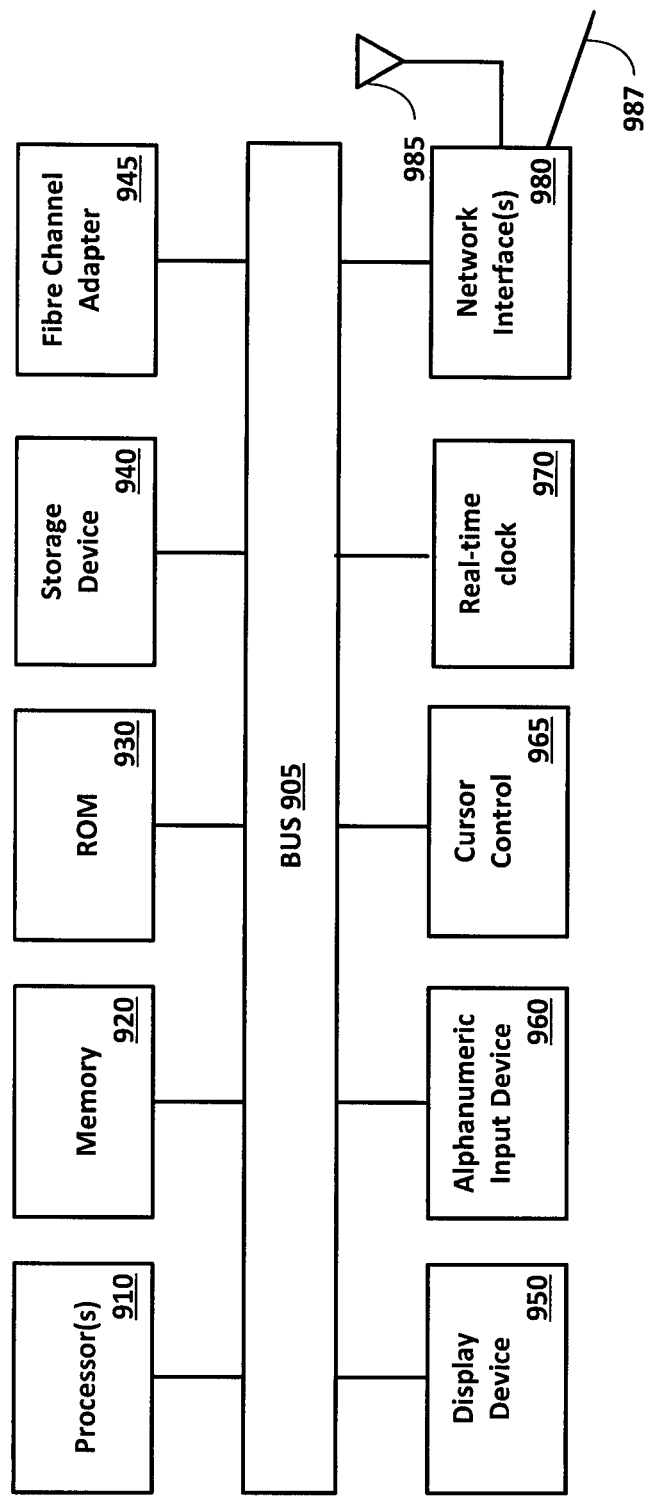
FIG. 9 illustrates, in block diagram form, an exemplary computing system for implementing concepts described herein.

FIG. 9 is a block diagram of one embodiment of a computing system 900. The computing system illustrated in FIG. 9 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 9 may be used to provide a computing device and/or a server device.

Computing system 900 includes bus 905 or other communication device to communicate information, and processor 910 coupled to bus 905 that may process information.

While computing system 900 is illustrated with a single processor, computing system 900 may include multiple processors and/or co-processors 910. Computing system 900 further may include random access memory (RAM) or other dynamic storage device 920 (referred to as main memory), coupled to bus 905 and may store information and instructions that may be executed by processor(s) 910. Main memory 920 may also be used to store temporary variables or other intermediate information during execution of instructions by processor 910.

Computing system 900 may also include read only memory (ROM) 930 and/or other static, non-transitory storage device 940 coupled to bus 905 that may store static information and instructions for processor(s) 910. Data storage device 940 may be coupled to bus 905 to store information and instructions. Data storage device 940 such as flash memory or a magnetic disk or optical disc and corresponding drive may be coupled to computing system 900.

Computing system 900 can further include a Fibre Channel Adapter (FCA) 945. FCA 945 can be configured to package a SCSI command into one or more FC frames for transport over a Fibre Channel network. FCA 945 can be configure to unpackage a SCSI command from one or more FC frames. FCA 945 can comprise at least one hardware processor, memory, and software configured to perform the above functions. FCA 945 also comprises hardware that interfaces to a Fibre Channel network.

Computing system 900 may also be coupled via bus 905 to display device 950, such as a cathode ray tube (CRT), light-emitting diode display (LED), or liquid crystal display (LCD), to display information to a user. Computing system 900 can also include an alphanumeric input device 960, including alphanumeric and other keys, which may be coupled to bus 905 to communicate information and command selections to processor(s) 910. Another type of user input device is cursor control 965, such as a touchpad, a mouse, a trackball, or cursor direction keys to communicate direction information and command selections to processor(s) 910 and to control cursor movement on display 950. Computing system 900 may further include a real-time clock 970. The real-time clock 970 may be used for generating date/time stamps for data records, computing elapsed time, and other time-keeping functions. A real-time clock 970 can be a battery-backed chipset with a settable date and time. Alternatively, a real-time clock 970 may include logic to retrieve a real-time from a network source such as a server or an Internet server via network interfaces 980, described below.

Computing system 900 further may include one or more network interface(s) 980 to provide access to a network, such as a local area network. Network interface(s) 980 may include, for example, a wireless network interface having antenna 985, which may represent one or more antenna(e). Computing system 900 can include multiple wireless network interfaces such as a combination of WiFi, Bluetooth® and cellular telephony interfaces. Network interfaces 980 can include a Fibre Channel interface. Network interface(s) 980 may also include, for example, a wired network interface to communicate with remote devices via network cable 987, which may be, for example, an Ethernet cable, a coaxial cable, a fiber optic cable, a serial cable, or a parallel cable.

In one embodiment, network interface(s) 980 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 980 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method comprising:
   establishing a virtual connection between a virtual machine on a host computing device and a primary storage device, the virtual connection established over a Fibre Channel (FC) network, the host computing device comprising an FC adapter that comprises hardware configured to transmit and receive FC frames over the FC network, the virtual connection having virtual connection identification information;
   receiving, by the virtual machine, from the primary storage device, a SCSI disk device type advertised by the primary storage device over the FC network, wherein a disk opened with the SCSI disk device type is configured to read and write SCSI commands, each SCSI command packaged within one or more FC frames;
   opening, by the virtual machine, a disk device having the advertised SCSI disk device type;
   writing, by the virtual machine, a SCSI command to the disk device;
   in response to determining that the SCSI command is one of READ, WRITE, or INQUIRY:
      packaging, by the FC adapter in the host computing device, the SCSI command within one or more FC frames, in response to the writing;
      transmitting, by the FC adapter, the one or more FC frames over FC network on the virtual connection, to the primary storage device;
      in response to the SCSI command having the virtual connection identification information in a SCSI logical block address field of a SCSI command block of the SCSI command, receiving a SCSI response to the SCSI command via one or more FC frames from the primary storage device, otherwise receiving an error from the primary storage device that the host computing device is not using the advertised SCSI device for transporting a SCSI command in one or more FC frames.

2. The method of claim 1, wherein the SCSI disk device type comprises a plurality of disk device characteristics, including a disk capacity and a disk device mode.

3. The method of claim 2, wherein the disk device mode comprises one of: SCSI pass-through mode, virtual raw device mode (RDM), or physical RDM.

4. The method of claim 2, wherein the disk device characteristics further include an indication that the SCSI disk device type comprises a generic SCSI disk device type supported by a guest operating system of the virtual machine.

5. The method of claim 1, wherein the SCSI command comprises a SCSI INQUIRY command, the method further comprising:
analyzing a received response to the SCSI INQUIRY command to determine whether the SCSI disk device type supports communication between the host computing device and primary storage device over the virtual connection using SCSI commands packaged within one or more FC frames;
writing, by the process, a next SCSI command to the disk device, in response to determining that the SCSI disk device type supports communication between the host computing device and the primary storage device over the virtual connection using SCSI commands packaged within one or more FC frames.

6. The method of claim 1 further comprising:
in response to determining that the SCSI command is not one of READ, WRITE, or INQUIRY:
packaging, by the FC adapter in the host computing device, the SCSI command within one or more FC frames;
transmitting, by the FC adapter, the one or more FC frames over FC network on the virtual connection, to the primary storage device; and
receiving, by the virtual machine, from the primary storage device, a false success status response.

7. A non-transitory computer readable medium, programmed with executable instructions that, when executed by a processing system, perform operations comprising:
establishing a virtual connection between a virtual machine on a host computing device and a primary storage device, the virtual connection established over a Fibre Channel (FC) network, the host computing device comprising an FC adapter that comprises hardware configured to transmit and receive FC frames over the FC network, the virtual connection having virtual connection identification information;
receiving, by the virtual machine, from the primary storage device, a SCSI disk device type advertised by the primary storage device over the FC network, wherein a disk opened with the SCSI disk device type is configured to read and write SCSI commands, each SCSI command packaged within one or more FC frames;
opening, by the virtual machine, a disk device having the advertised SCSI disk device type;
writing, by the virtual machine, a SCSI command to the disk device;
in response to determining that the SCSI command is one of READ, WRITE, or INQUIRY:
packaging, by the FC adapter in the host computing device, the SCSI command within one or more FC frames, in response to the writing;
transmitting, by the FC adapter, the one or more FC frames over FC network on the virtual connection, to the primary storage device;
in response to the SCSI command having the virtual connection identification information in a SCSI logical block address field of a SCSI command block of the SCSI command, receiving a SCSI response to the SCSI command via one or more FC frames from the primary storage device, otherwise receiving an error from the primary storage device that the host computing device is not using the advertised SCSI device for transporting a SCSI command in one or more FC frames.

8. The medium of claim 7, wherein the SCSI disk device type comprises a plurality of disk device characteristics, including a disk capacity and a disk device mode.

9. The medium of claim 8, wherein the disk device mode comprises one of: SCSI pass-through mode, virtual raw device mode (RDM), or physical RDM.

10. The medium of claim 8, wherein the disk device characteristics further include an indication that the SCSI disk device type comprises a generic SCSI disk device type supported by a guest operating system of the virtual machine.

11. The medium of claim 7, wherein the SCSI command comprises a SCSI INQUIRY command, the operations further comprising:
analyzing a received response to the SCSI INQUIRY command to determine whether the SCSI disk device type supports communication between the host computing device and primary storage device over the virtual connection using SCSI commands packaged within one or more FC frames;
writing, by the process, a next SCSI command to the disk device, in response to determining that the SCSI disk device type supports communication between the host computing device and the primary storage device over the virtual connection using SCSI commands packaged within one or more FC frames.

12. The medium of claim 7, the operations further comprising:
in response to determining that the SCSI command is not one of READ, WRITE, or INQUIRY:
packaging, by the FC adapter in the host computing device, the SCSI command within one or more FC frames;
transmitting, by the FC adapter, the one or more FC frames over FC network on the virtual connection, to the primary storage device; and
receiving, by the virtual machine, from the primary storage device, a false success status response.

13. A processing system, comprising a hardware processor coupled to a memory programmed with executable instructions, that when executed by the processing system, perform operations comprising:
establishing a virtual connection between a virtual machine on a host computing device and a primary storage device, the virtual connection established over a Fibre Channel (FC) network, the host computing device comprising an FC adapter that comprises hardware configured to transmit and receive FC frames over the FC network, the virtual connection having virtual connection identification information;
receiving, by the virtual machine, from the primary storage device, a SCSI disk device type advertised by the primary storage device over the FC network, wherein a disk opened with the SCSI disk device type is configured to read and write SCSI commands, each SCSI command packaged within one or more FC frames;
opening, by the virtual machine, a disk device having the advertised SCSI disk device type;
writing, by the virtual machine, a SCSI command to the disk device;

in response to determining that the SCSI command is one of READ, WRITE, or INQUIRY:
  packaging, by the FC adapter in the host computing device, the SCSI command within one or more FC frames, in response to the writing;
  transmitting, by the FC adapter, the one or more FC frames over FC network on the virtual connection, to the primary storage device;
  in response to the SCSI command having the virtual connection identification information in a SCSI logical block address field of a SCSI command block of the SCSI command, receiving a SCSI response to the SCSI command via one or more FC frames from the primary storage device, otherwise receiving an error from the primary storage device that the host computing device is not using the advertised SCSI device for transporting a SCSI command in one or more FC frames.

14. The system of claim 13, wherein the SCSI disk device type comprises a plurality of disk device characteristics, including a disk capacity and a disk device mode.

15. The system of claim 14, wherein the disk device mode comprises one of: SCSI pass-through mode, virtual raw device mode (RDM), or physical RDM.

16. The system of claim 14, wherein the disk device characteristics further include an indication that the SCSI disk device type comprises a generic SCSI disk device type supported by a guest operating system of the virtual machine.

17. The system of claim 13, wherein the SCSI command comprises a SCSI INQUIRY command, the operations further comprising:
  analyzing a received response to the SCSI INQUIRY command to determine whether the SCSI disk device type supports communication between the host computing device and primary storage device over the virtual connection using SCSI commands packaged within one or more FC frames;
  writing, by the process, a next SCSI command to the disk device, in response to determining that the SCSI disk device type supports communication between the host computing device and the primary storage device over the virtual connection using SCSI commands packaged within one or more FC frames.

18. The system of claim 13, the operations further comprising:
  in response to determining that the SCSI command is not one of READ, WRITE, or INQUIRY:
    packaging, by the FC adapter in the host computing device, the SCSI command within one or more FC frames;
    transmitting, by the FC adapter, the one or more FC frames over FC network on the virtual connection, to the primary storage device; and
    receiving, by the virtual machine, a false success status response.

19. The method of claim 1, wherein the virtual connection identification information comprises a tuple having a virtual connection identifier and one or more of: a generation number, or a verifier.

20. The method of claim 19, wherein the generation number tracks multiple generations of a virtual connection and the verifier is a unique identifier of a particular instance of a virtual connection.

* * * * *